US009206335B2

(12) United States Patent
Hager et al.

(10) Patent No.: US 9,206,335 B2
(45) Date of Patent: Dec. 8, 2015

(54) SILICA COATING FOR ENHANCED HYDROPHILICITY

(71) Applicant: 3M INNOVATIVE PROPERTIES COMPANY, St. Paul, MN (US)

(72) Inventors: Patrick J. Hager, Woodbury, MN (US); Jay S. Schlechte, Oakdale, MN (US); Elaine M. Yorkgitis, St. Paul, MN (US); Naiyong Jing, Woodbury, MN (US)

(73) Assignee: 3M Innovation Properties Company, St. Paul, MN (US)

( * ) Notice: Subject to any disclaimer, the term of this patent is extended or adjusted under 35 U.S.C. 154(b) by 415 days.

(21) Appl. No.: 13/678,666

(22) Filed: Nov. 16, 2012

(65) Prior Publication Data
US 2013/0071649 A1    Mar. 21, 2013

Related U.S. Application Data

(63) Continuation-in-part of application No. 12/573,925, filed on Oct. 6, 2009, now abandoned.

(60) Provisional application No. 61/104,541, filed on Oct. 10, 2008.

(51) Int. Cl.
| | |
|---|---|
| C08G 77/04 | (2006.01) |
| C09D 183/06 | (2006.01) |
| B82Y 30/00 | (2011.01) |
| C09D 7/12 | (2006.01) |
| C09C 1/00 | (2006.01) |
| C09C 1/30 | (2006.01) |
| C09D 183/02 | (2006.01) |
| C09D 183/04 | (2006.01) |
| C08K 3/36 | (2006.01) |
| C08G 77/02 | (2006.01) |
| C08K 5/00 | (2006.01) |
| C08K 5/5419 | (2006.01) |
| C08K 5/5425 | (2006.01) |
| C08K 5/5435 | (2006.01) |
| C08K 5/548 | (2006.01) |
| C08K 9/06 | (2006.01) |
| C08G 77/18 | (2006.01) |
| C08G 77/20 | (2006.01) |

(52) U.S. Cl.
CPC .............. *C09D 183/06* (2013.01); *B82Y 30/00* (2013.01); *C08G 77/045* (2013.01); *C09C 1/0009* (2013.01); *C09C 1/309* (2013.01); *C09C 1/3081* (2013.01); *C09D 7/1225* (2013.01); *C09D 7/1266* (2013.01); *C09D 183/02* (2013.01); *C09D 183/04* (2013.01); *C01P 2004/64* (2013.01); *C01P 2006/12* (2013.01); *C01P 2006/22* (2013.01); *C08G 77/02* (2013.01); *C08G 77/18* (2013.01); *C08G 77/20* (2013.01); *C08K 3/36* (2013.01); *C08K 5/0091* (2013.01); *C08K 5/548* (2013.01); *C08K 5/5419* (2013.01); *C08K 5/5425* (2013.01); *C08K 5/5435* (2013.01); *C08K 9/06* (2013.01); *Y10T 428/259* (2015.01)

(58) Field of Classification Search
CPC ........ C08G 77/02; C08G 77/045; C08K 3/36; Y10T 428/259
See application file for complete search history.

(56) References Cited

U.S. PATENT DOCUMENTS

| | | | |
|---|---|---|---|
| 2,801,185 | A | 7/1957 | Iler |
| 4,275,118 | A | 6/1981 | Baney |
| 4,522,958 | A | 6/1985 | Das |
| 5,204,219 | A | 4/1993 | Van Ooij |
| 5,286,782 | A | 2/1994 | Lamb |
| 5,354,797 | A | 10/1994 | Anderson |
| 5,464,900 | A | 11/1995 | Stofko |
| 5,639,546 | A | 6/1997 | Bilkadi |
| 5,723,175 | A | 3/1998 | Scholz |
| 5,753,373 | A | 5/1998 | Scholz |
| 5,997,621 | A | 12/1999 | Scholz |
| 6,013,724 | A | 1/2000 | Mizutani |
| 6,040,053 | A | 3/2000 | Scholz |
| 6,096,469 | A | 8/2000 | Anderson |
| 6,165,256 | A | 12/2000 | Hayakawa |
| 6,251,523 | B1 | 6/2001 | Takahashi |
| 6,251,981 | B1 | 6/2001 | Tanaka |
| 6,258,969 | B1 | 7/2001 | Sawai |

(Continued)

FOREIGN PATENT DOCUMENTS

| | | |
|---|---|---|
| EP | 0 145 308 | 6/1985 |
| EP | 0 263 428 | 4/1988 |

(Continued)

OTHER PUBLICATIONS

Iler, "The Chemistry of Silica—Solubility, Polymerization, Colloid and Surface Properties, and Biochemistry," *John Wiley & Sons*, p. 665, 1979.
Plueddemann, "Silane Coupling Agents," *Pleunum Press: New York*, p. 20, 1982.
Snowtex product literature (2007) retrieved from nissanchem-use.com/snowtex.php.

(Continued)

*Primary Examiner* — Elizabeth A Robinson
(74) *Attorney, Agent, or Firm* — Kent S. Kokko

(57) ABSTRACT

A coating composition is provided comprising a) an aqueous dispersion, having a pH of less than 7.5, of silica nanoparticles having average particle diameters of 40 nanometers or less, b) an alkoxysilane oligomer; c) a silane coupling agent, and d) optionally a metal β-diketone complexing agent. The compositions may be used to prepare coated articles wherein the coating is substantially uniform in thickness, durably adheres to the substrate, and provides hydrophilic and/or antireflection surface properties to the substrate.

19 Claims, No Drawings

(56) References Cited

U.S. PATENT DOCUMENTS

| | | |
|---|---|---|
| 6,428,898 B1 | 8/2002 | Barsotti |
| 6,544,593 B1 | 4/2003 | Nagata |
| 6,599,976 B2 | 7/2003 | Kobayashi |
| 6,605,683 B1 | 8/2003 | Zhang |
| 6,767,984 B2 | 7/2004 | Toui |
| 6,797,391 B2 | 9/2004 | Shibato |
| 7,279,173 B2 | 10/2007 | Schiestel |
| 7,354,624 B2 | 4/2008 | Millero |
| 2001/0051213 A1 | 12/2001 | Schulz |
| 2004/0068035 A1 | 4/2004 | Paiva |
| 2005/0266248 A1 | 12/2005 | Millero |
| 2006/0062923 A1 | 3/2006 | Dilley |
| 2006/0204655 A1 | 9/2006 | Takahashi |
| 2007/0051274 A1 | 3/2007 | Saito |
| 2007/0104922 A1 | 5/2007 | Zhai |

FOREIGN PATENT DOCUMENTS

| | | |
|---|---|---|
| EP | 0 424 006 | 4/1991 |
| EP | 0 570 165 | 11/1993 |
| EP | 0 372 756 | 12/1996 |
| EP | 0 863 191 | 9/1998 |
| EP | 1 132 448 | 9/2001 |
| GB | 1 454 960 | 11/1976 |
| GB | 2 041 956 | 9/1980 |
| GB | 2 137 648 | 10/1984 |
| JP | 05163463 | 6/1993 |
| JP | 09-221608 | 8/1997 |
| JP | 09316397 | 12/1997 |
| JP | 11-124501 | 5/1999 |
| JP | 11-323257 | 11/1999 |
| JP | 2006124667 | 5/2006 |
| JP | 2006124667 A * | 5/2006 |
| JP | 2007-297648 | 11/2007 |
| JP | 2010-163584 | 7/2010 |
| WO | WO 96/18691 | 6/1996 |
| WO | WO 00/77105 | 12/2000 |
| WO | WO 2005/118723 | 12/2005 |
| WO | WO 2007/119812 | 10/2007 |
| WO | WO 2009/140482 | 11/2009 |

OTHER PUBLICATIONS

Zhang, "Catalytic Effect of Aluminum Acetylacetonate on Hydrolysis and Polymerization of Methyltrimethoxysilane," *Langmuir*, vol. 13, pp. 473-476, 1997.

* cited by examiner

SILICA COATING FOR ENHANCED HYDROPHILICITY

FIELD OF THE INVENTION

The present invention relates to silica nanoparticle coating compositions which may be used in treating substrates, in particular substrates such as thermoplastic or thermosetting plastics, crosslinked polymeric paints and coatings, and ceramics or glass. The coating compositions may be used to render the substrates hydrophilic, water-sheeting, self-drying, resistant to soiling, and easier to clean.

BACKGROUND

Articles having hydrophilic or water-wettable surfaces are desirable in many applications. In many environments, dust, dirt, oil and pollutants are common contaminants which tend to deposit from either the dry state or from suspension in rainwater onto objects such as vehicles, road signs, buildings, and the like. A hydrophilic protective coating can reduce or eliminate this contamination and provide a substrate that is easier to clean—without the use of detergents or soaps. Additionally, hydrophilic surfaces can also provide for water, in the form of rainfall or from water sprays, to sheet off efficiently, which in turn results in easier cleaning and drying of such surfaces. This can result in more aesthetically pleasing and cleaner surfaces by retarding soiling and preventing the formation of water spots caused by concentration of environmental dirt or contaminants or hard water minerals during drying of individual water droplets. In addition, hydrophilic surfaces can reduce the tendency of atmospheric moisture to condense and cause fogging.

Common surface protectants, like those used to protect painted vehicle finishes, typically provide a very hydrophobic surface, that is, a surface exhibiting low surface energy, high water contact angle, and the commonly observed behavior known as "water beading". This causes the undesirable formation of water spotting, by increasing the tendency of water to bead into individual droplets rather than sheeting off and self-drying.

SUMMARY

The present disclosure provides a coating composition comprising an aqueous dispersion having a pH of less than 7.5 of silica nanoparticles having average particle diameters of 40 nanometers or less, an alkoxysilane oligomer; a silane coupling agent, and optionally a metal β-diketone complexing agent. Preferably, the coating composition has a pH of less than 5 by addition of an acid having a pKa of <5, preferably <2.5, most preferably <1.

The present invention provides a protective coating on substrates that is relatively durable, more resistant to contamination and easier to clean than the substrate surface itself. The present invention provides in one embodiment a method and composition for use in preparing a coated article comprising a substrate, preferably a hard substrate, and a coating having a thickness greater than a monolayer (which is typically greater than about 15 Angstroms thick) deposited thereon. The coating material is typically present in an amount that does not deleteriously affect the appearance and optical characteristics of the article.

The present disclosure further provides a coated article comprising a substrate, particularly a polymeric substrate or a metal or polymeric substrate having a single-layer or multi-layer polymeric coating, having a silica nanoparticle-containing coating thereon. The coating comprises a continuous coating of silica nanoparticles which are bound in a crosslinked silicate matrix, the particles having an average primary particle size of 40 nanometers or less. The coating is substantially uniform in thickness and is durably adhered to the substrate.

Although hydrophilic surface treatments are known, many perform poorly in the harsh conditions found in exterior environments, for example, on vehicles and road signage. Furthermore, for safe application, drying, and curing, such treatments desirably cure at ambient temperatures without using baking, radiation or other active curing activation. Such coatings are desirably water-based in order to conform to environmental regulations (U.S. EPA 40 C.F.R. 51.100(s) and others) which prohibit products having a volatile organic content (VOC) greater than about 20% by weight of the composition, depending on its purpose and method of application. However, known ambient curing compositions, particularly those based on condensation chemistry of siloxane compounds, are unstable in the presence of water and at most values of pH and tend to form gels or precipitates which in turn yield poor quality coatings.

Typically, substrates to be treated such as vehicle paint finishes, roadway signs, and other exterior applications have hydrophobic or low surface energy surfaces. Coating of water-based compositions having low content of organic solvents is difficult to accomplish on hydrophobic surfaces because of the inability of the coating formulation to spread and wet the hydrophobic surface. The use of surfactants or wetting agents to effect adequate wetting and spreading of water-based coating formulations can lead to haze of the dried coating film and reduced adhesion to the substrate, causing significantly diminished durability.

Another problem with hydrophilic coatings, especially silica-based coatings, is the highly complex nature of the surface chemistry, reaction chemistry and solution chemistry of colloidal silica and colloidal silica films. For example, the interaction of ions with the silica surface is not fully understood despite extensive study (See Iler, "The Chemistry of Silica," John Wiley, 1979 p. 665.) Despite such difficulties, a silica-based water-spreading film that has enhanced durability is provided in accordance with the invention described below.

The coating compositions described herein can readily wet-out and spread over hydrophobic substrates, particularly polymeric substrates. The dried coating adheres well to a variety of substrates, particularly polymeric substrates, and can provide such substrates with a durable hydrophilic surface, that is, a coated surface exhibiting a water contact angle of less than about 50° even for substrates having, in their uncoated condition, water contact angles in excess of 50°. Coatings that resulted from these compositions may further provide a water-resistant and mechanically durable hydrophilic surface to a substrate, such as glass, polymeric and painted substrates. Furthermore, the coatings may provide protective layers and exhibit rinse-away removal of organic and inorganic contaminants including road grime, dust, oil, and other dirt, and reduce or reverse attraction of certain contaminants such as pollen. The hydrophilic nature of the coatings tends to cause water to sheet out, displacing overlying dirt and other contaminants and may in addition retard adhesion of contaminants. In many embodiments, the cured coatings are transparent. The term transparent means an average transmissivity of at least 85% of incident light in the visible spectrum (about 400-700 nm wavelength). In some embodiments the transmissivity is at least 90%.

The coating may also provide antifogging properties and antistatic properties to polymeric film and sheet materials that are subject to static build-up and may provide abrasion resistance and slip properties to polymeric materials, such as film and sheet materials, thereby improving their handling properties. In addition such coatings may diminish or eliminate water spotting found when water dries on such treated surfaces.

The method of the invention may include small amounts of solvents and does not require surfactants for coating on substrates, and therefore are less hazardous and are within established limitations for use of volatile organic compounds (VOCs). Other advantages include more uniform coatings, better adhesion to substrates, better durability of the coating, higher antireflection and increased transmissivity, and providing a hydrophilic, easy to clean surface from which contaminants may be rinsed away.

DETAILED DESCRIPTION

The present disclosure provides a coating composition comprising an aqueous dispersion having a pH of less than 7.5 (preferably less than 5, more preferably less than 4), of silica nanoparticles having average particle diameters of 40 nanometers or less; an alkoxysilane oligomer; a silane coupling agent, and optionally a metal β-dicarbonyl complexing agent. Preferably the composition is acidified with an acid having a pKa of less than 5, preferably less than 2.5, most preferably less than 1. In some embodiments, the coating composition comprises the reaction product of the alkoxysilane oligomer and the silane coupling agent.

The disclosure further provides a method of providing a coating to a substrate comprising coating the substrate with the coating composition and drying the coating. The coatings derived from the coating composition are particularly suitable for providing hydrophilic coatings. Such coatings cause water or moisture to wet out and spread on a treated substrate surface. As result, the coatings may provide an easy- or self-cleaning surface from which contaminants may be displaced under flowing water, with minimal or no scrubbing. Such coatings are desirable for automotive, marine and household applications in which substrates such as glass, painted and clear coated surfaces, and rigid or polymeric sheets may be rendered hydrophilic. Such applications may include automobile body panels, windshields, boat hull and deck surfaces, flexible and rigid polymeric auto and marine windows, porcelain and ceramic surfaces, and countertops.

Although the coating compositions of the present invention may be readily prepared and applied at any pH value below about 7.5, it has been found that coating compositions of lower pH, particularly below a pH of about 5, preferably below a pH of about 4, and more preferably below a pH of about 3.5 can wet out and spread onto hydrophobic substrate surfaces. The coating formulations, which are substantially water-based, exhibit improved stability during storage, i.e. resistance to particle agglomeration and haze.

Not to be bound by theory, it is believed that coating compositions comprising unmodified silica nanoparticles along with a reactive alkoxysilane oligomer, silane coupling agent and optionally a metal β-diketone complexing agent are capable of forming a substantially linear partially network-like structure while still in the liquid-suspended state. Such a structure may improve the ability of such coatings to wet out and spread onto a hydrophobic surface without simultaneously causing gelation.

However, such in situ network development can potentially result in agglomeration, gelation and formation of precipitated particulates in the coating solution, which reduces wet out and forms undesirable particle-filled coatings. Surprisingly, the use of low pH formulations tends to retard formation of agglomerates, gel or precipitated particles, while maintaining the hydrophilic properties. The resulting coatings, in many embodiments, exhibit improved durability and appearance; in particular, many embodiments of such coatings lack the optical defect known as iridescence or the rainbow effect caused by optical interference internal to the coating and from irregular coating surface heights. This may be observed even in dilute solution concentrations of less than about 1.5% solids content.

The silica nanoparticles used in this composition are dispersions of submicron size silica nanoparticles in an aqueous or in an aqueous organic solvent mixtures having average particle diameter of 40 nanometers or less, preferably 20 nanometers or less, and more preferably 10 nanometers or less. The average particle size may be determined using transmission electron microscopy.

In some embodiments, the silica nanoparticles are not surface-modified. In other embodiments, surface-modified nanoparticles can provide improved stability of the dispersion. It is believed that surface modification increases the steric and/or electrostatic stabilization effect between particles, preventing them from bonding together to form larger, unstable agglomerates, depending on the nature and molecular size of the modifying agent. In such cases, the use of surface-modified nanoparticles can act synergistically with lower solution pH to provide either a more stabilized dispersion formulation or to expand the range of pH over which the dispersion formulations are stable. This may allow use of the product at nearly neutral pH levels, which may reduce the likelihood of irritation or hazard to the user.

The smaller nanoparticles, those of 20 nanometers or less, generally provide better coatings, when acidified. Smaller nanoparticles give coatings having improved appearance with respect to iridescence, haze and coating thickness variability; better adhesion or durability to the coated substrate; and better performance with respect to lower water contact angles. Further, the nanoparticles generally have a surface area greater than about 150 $m^2$/gram, preferably greater than 200 $m^2$/gram, and more preferably greater than 400 $m^2$/gram. The particles preferably have narrow particle size distributions, that is, a polydispersity of 2.0 or less, preferably 1.5 or less.

Inorganic silica nanoparticles in aqueous media (sols) are well known in the art and available commercially. Silica sols in water or aqueous alcohol solutions are available commercially under such trade names as LUDOX (manufactured by E.I. du Pont de Nemours and Co., Inc., Wilmington, Del., USA), NYACOL (available from Nyacol Co., Ashland, Mass.) or NALCO (manufactured by Nalco Chemical Co., Naperville, Ill. USA). One useful silica sol is NALCO 2326 available as a silica sol with mean particle size of 5 nanometers, pH 10.5, and solid content 15% by weight. Other commercially available silica nanoparticles include "NALCO 1115" and "NALCO 1130," commercially available from NALCO Chemical Co., "Remasol SP30," commercially available from Remet Corp. (Utica, N.Y., USA), and "LUDOX SM," commercially available from E. I. Du Pont de Nemours Co., Inc.

Non-aqueous silica sols (also called silica organosols) may also be used and are silica sol dispersions wherein the liquid phase is an organic solvent, or an aqueous organic solvent. In the practice of this invention, the silica sol is chosen so that its liquid phase is compatible with the aqueous or an aqueous organic solvent. However, it has been observed that sodium-stabilized silica nanoparticles should first be acidified prior to dilution with an organic solvent such as ethanol. Dilution prior to acidification may yield poor or non-uniform coatings Ammonium-stabilized silica nanoparticles may generally be diluted and acidified in any order.

If desired, larger silica particles may be added, in amounts that do not deleteriously decrease the coatability of the composition on a selected substrate, and do not reduce the transmissivity and/or the hydrophilicity. Such coatings would have a bi- or multi-modal distribution of silica particle size. These additional silica particles generally have an average particle size of greater than 40 to 100 nanometers, preferably 50 to 100 nanometers, and may be used in ratios of 0.2:99.8 to 99.8:0.2, relative to the weight of the silica nanoparticles of less than 40 nanometers. Larger particles are preferably used in rations of 1:9 to 9:1. Generally the total weight of silica particles (i.e. the total of <40 nm and larger silica particles) in the composition is between about 30 to 95 wt. %, preferably 50-75 wt % based on total solids.

In some embodiments, the silica nanoparticles may be surface-modified using a surface-modifying agent. A surface-modified silica particle includes surface groups attached to the surface of the particle. The surface groups modify the hydrophobic or hydrophilic nature of the particle, but are preferably hydrophilic. The surface groups may be selected to provide a statistically averaged, randomly surface-modified particle. In some embodiments, the surface groups are present in an amount sufficient to form a monolayer, preferably a continuous monolayer, on the surface of the particle. Generally, less than complete modification of the available surface functional groups (i.e. silanol groups) is desirable so as to allow bonding of the nanoparticles to the silicate matrix via the residual unmodified silanol surface groups.

A variety of methods are available for modifying the surface of nanoparticles including, e.g., adding a surface-modifying agent to nanoparticles (e.g., in the form of a powder or a colloidal dispersion) and allowing the surface-modifying agent to react with the nanoparticles. Other useful surface-modification processes are described in, e.g., U.S. Pat. No. 2,801,185 (Iler) and U.S. Pat. No. 4,522,958 (Das et al.). Surface-modifying groups may be derived from surface-modifying agents. Schematically, surface-modifying agents can be represented by the formula A-B, where the A group is capable of attaching to the surface of the particle (i.e., the silanol groups) and the B group is a compatibilizing group that does not react with other components in the system (e.g. the substrate). Compatibilizing groups can be selected to render the particle relatively more polar, relatively less polar or relatively non-polar. Preferably the compatibilizing group is a non-basic hydrophilic group such as an acid group (including carboxylate, sulfonate and phosphonate groups), ammonium group or poly(oxyethylene) group, or hydroxyl group.

Such optional surface-modifying agents may be used in amounts such that 0 to 100%, generally 1 to 90% (if present) of the surface functional groups (Si—OH groups) of the silica nanoparticles are functionalized. The number of functional groups is experimentally determined where quantities of nanoparticles are reacted with an excess of surface modifying agent so that all available reactive sites are functionalized with a surface modifying agent. Lower percentages of functionalization may then be calculated from the result. Generally, the amount of surface modifying agent is used in amount sufficient to provide up to twice the equal weight of surface modifying agent relative to the weight of inorganic nanoparticles. When used, the weight ratio of surface modifying agent to inorganic nanoparticles is preferably 2:1 to 1:10. If surface-modified silica nanoparticles are desired, it is preferred to modify the nanoparticles prior to incorporation into the coating composition.

The coating composition may be acidified to the desired pH level with an acid having a pKa ($H_2O$) of <5, preferably less than 2.5, most preferably less than 1. Useful acids include both organic and inorganic acids and may be exemplified by oxalic acid, citric acid, benzoic acid, acetic acid, formic acid, propionic acid, benzenesulfonic acid, $H_2SO_3$, $H_3PO_4$, $CF_3CO_2H$, HCl, HBr, HI, $HBrO_3$, $HNO_3$, $HClO_4$, $H_2SO_4$, $CH_3SO_3H$, $CF_3SO_3H$, $CF_3CO_2H$, and $CH_3OSO_2OH$. Most preferred acids include HCl, $HNO_3$, $H_2SO_4$, and $H_3PO_4$. In some embodiments, it is desirable to provide a mixture of an organic and inorganic acid. In some embodiments one may use a mixture of acids comprising those having a pKa≤5 (preferably <2.5, most preferably less than 1) and minor amounts of other acids having pKa's>5. It has been found that using weaker acids having a pKa of ≥5 may not provide a uniform coating having the desirable properties which may include transmissivity, cleanability and/or durability. In particular, coating compositions with weaker acids, or basic coating compositions, typically bead up on the surface of a polymeric substrate.

In many embodiments, the coating composition generally contains sufficient acid to provide a pH of less than 5, preferably less than 4, most preferably less than 3. In some embodiments, it has been found that the pH of the coating composition can be adjusted to pH 5-7.5 after reducing the pH to less than 5. This allows one to coat materials which are sensitive to low pH.

The coating composition further comprises an alkoxysilane oligomer. More particularly, such alkoxysilane oligomers are the fully- or partially-hydrolyzed condensation reaction product of one or more tetralkoxysilanes and optionally one or more trialkoxysilanes and optionally one or more dialkoxysilanes. Such alkoxy silane oligomers may be represented by the general formula:

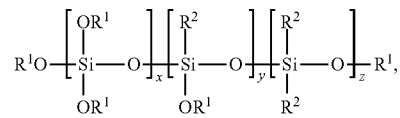

where
each $R^1$ is individually H, $C_1$ to $C_4$ alkyl, or an alkali metal cation, and alkali earth metal cation or ammonium cation;
each $R^2$ is $C_1$ to $C_4$ alkyl,
x is 2 to 100, preferably 3 to 15,
y and z may be zero,
x is greater than y+z,
x+y+z is 2 to 100, preferably 3 to 15.

It will be understood with respect to the alkoxy silane oligomer, that while $R^1$ may be selected from alkali metal, alkali earth metal or ammonium cations, the addition of an acid during formulation of compounding will convert such cations to $R^1$=H. Further, one skilled in the art will understand that such alkoxysilane oligomers will be a complex mixture of linear and branched products. It will be further understand that such alkoxysilane oligomers may be represented by the general formula $Si(O)_o(OR^1)_p$, where each $R^1$ is individually H, $C_1$ to $C_4$ alkyl, an alkali metal cation, an alkali earth metal cation or an ammonium cation, o is greater than zero and less than 1.2, p is greater than 1.4 and less than 4 and with the proviso that (2o+p)=4, as described in U.S. Pat. No. 6,599,976 (Kobayashi et al.) incorporated by reference.

The alkoxysilane oligomers of Formula I may generally be prepared by condensation of the tetraalkoxysilanes and optionally one or more trialkoxysilanes and/or dialkoxysilanes. Useful methods are described in U.S. 2007/0051274 (Saito et al.), U.S. Pat. No. 6,258,969 (Sawai et al.) and U.S. Pat. No. 6,599,976 (Kobayashi et al.), each incorporated herein by reference. Oligomeric alkoxy silanes of Formula I are also commercially available as MKC Silicate MS51™ and MKC Silicate MS56™ the partial hydrolysis/condensation products of tetramethoxysilane and MKC Silicate BTS™, the partial hydrolysis/condensation products of tetrabutoxysilane from Mitsubishi Chemical Corporation, and Ethyl Silicate ES40™, the partial hydrolysis/condensation products of tetraethoxysilane is commercially available from Colcoat Co., Ltd, JP. It will be understood by those skilled in the art that the exact nature of the oligomer, including its repeating unit characteristics and molecular weight, is not limited to the commercial examples cited here but may be varied substantially without departing from the scope of this invention. For example, higher or lower molecular weight oligomeric alkoxy silanes may allow improvements in coating on surfaces having varying texture or surface energy, the precise oligomers chosen to optimize performance in application and dried coating characteristics.

The oligomeric alkoxysilanes are typically added to the composition at levels of 1-55 percent by weight of the total dried coating composition and more preferably about 10 to 45 percent by weight of the total dried composition.

The coating composition further comprises a silane coupling agent of the formula:

$$[(Y)_c-R^3]_d-Si-(OR^4)_b(R^4)_{4-(b+d)} \quad II$$

where

Y is a non-basic group that may bond to, or associate with, the surface of a preselected substrate, and may be selected, for example, from an organic functional group or a non-functional hydrocarbyl group, such an alkyl or aryl group, $R^3$ is a covalent bond or a di- or trivalent hydrocarbon bridging group, and $R^4$ is independently an alkyl, aryl, or aralkyl group of 1 to 8 carbon atoms optionally substituted in available positions by oxygen, nitrogen and/or sulfur atoms; c is 1 or 2, b is 1 to 3 and d is 1 or 2. Preferably b is 3, c is 1 and d is 1, and $(b+d) \leq 4$.

The non-basic Y group of Formula II may bond to or associate with the surface of the substrate by formation of a covalent bond, such as by condensation, addition or displacement reaction, or associate with the substrate by ionic bonds or van der Waals forces. More specifically, $R^3$ is a covalent bond, or a di- or trivalent hydrocarbon bridging group of about 1 to 20 carbon atoms, including alkylene, arylene and combinations thereof, optionally including in the backbone 1 to 5 moieties selected from the group consisting of —O—, —C(O), —S—, —SO$_2$— and —NR$^2$— groups (and combinations thereof such as —C(O)—O—), wherein $R^2$ is hydrogen or a $C_1$-$C_4$ alkyl group. In another embodiment, $R^3$ is a poly(alkylene oxide) moiety of the formula —(OCH$_2$CH$_2$—)$_n$(OCH$_2$CH(R$^1$))$_m$—, where wherein n is at least 5, m may be 0, and preferably at least 1, and the mole ratio of n:m is at least 2:1 (preferably at least 3:1). It will be understood that when "c" of Formula II is 1, then $R^3$ is a covalent bond or a divalent hydrocarbon bridging groups, and when "c" is 2, then $R^3$ is a trivalent bridging group. Preferably, $R^3$ is a divalent alkylene and c is 1. Preferably $R^4$ is $C_1$ to $C_4$ alkyl; and b is 1 to 3.

In some embodiments, Y is a non-basic organic functional group $Y^1$, which may be selected from an epoxy group (including glycidyl), an acid group, an ester group, a hydroxy group and a mercapto group. Useful epoxy functional silane coupling agents include 2-(3,4-epoxycyclohexyl)ethyltriethoxysilane, 2-(3,4-epoxycyclohexyl)ethyltrimethoxysilane, 5,6-epoxyhexyltriethoxysilane, (3-glycidoxypropyl)triethoxysilane, and (3-glycidoxypropyl)trimethoxysilane). Useful mercapto-functional silane coupling agent include 3-mercaptopropyltrimethoxysilane and 3-mercaptopropyltriethoxysilane In another embodiment, Y is an ethylenically unsaturated group $Y^2$, which may be selected from ethylenically unsaturated polymerizable groups, including vinyl, allyl, vinyloxy, allyloxy, and (meth)acryloyl. Silane coupling agents with ethylenically unsaturated groups includes organosilanes such as, for example, 3-(methacryloyloxy)propyltrimethoxysilane, 3-acryloxypropyltrimethoxysilane, 3-(methacryloyloxy)propyltriethoxysilane, 3-(methacryloyloxy) propylmethyldimethoxysilane, 3-(acryloyloxypropyl)methyldimethoxysilane, 3-(methacryloyloxy)propyldimethylethoxysilane, 3-(methacryloyloxy)propyldiethylethoxysilane, vinyldimethylethoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, and mixtures thereof. Preferably $Y^2$ is vinyl, allyl, vinyloxy, or allyloxy.

In another embodiment, Y is a non-functional hydrocarbyl group $Y^3$ selected from alkyl groups an aryl groups. Useful non-functional silane coupling agents include methyl trimethoxysilane, methyl triethoxysilane, methyl tripropoxysilane, methyl triisopropoxysilane, ethyl trimethoxysilane, ethyl triethoxysilane, ethyl tripropoxysilane, ethyl triisopropoxysilane, propyl trimethoxysilane, propyl triethoxysilane, butyl trimethoxysilane, butyl triethoxysilane, pentyl trimethoxysilane, pentyl triethoxysilane, hexyl trimethoxysilane, hexyl triethoxysilane, phenyl trimethoxysilane, phenyl triethoxysilane, phenyl tripropoxysilane, phenyl triisopropoxysilane, benzyl trimethoxysilane, benzyl triethoxysilane.

Silane coupling agents may be made, for example, by conventional techniques, or they may be purchased from commercial suppliers such as, for example, Gelest, Inc. (Morrisville, Pa., USA); Momentive Performance Materials (Wilton, Conn., USA); and United Chemical Technologies, Inc. (Horsham, Pa., USA) Further reference may be made to E. P. Pleuddeman, "Silane Coupling Agents", Plenum Press: New York, 1982, p. 20 and to U.S. Pat. No. 5,204,219, issued to Van Ooij et al., U.S. Pat. No. 5,464,900, issued to Stofko et al., and U.S. Pat. No. 5,639,546, issued to Bilkadi and European Patent Application No. 0,372,756 A2.

The amount of silane coupling agent is typically in a range of 0.25 to 35 weight percent, preferably 10 to 30 weight percent, based on total added solids of the coating composition.

The coating composition may further comprise a metal β-diketone complexing agent having a metal and a 1,3-dioxopropylene group. The β-diketone complexing agent is believed to function as hydrolysis catalyst in the formation of bonds between one or more of the silica nanoparticles, the alkoxy silane oligomer and the silane coupling agent, and may promote deprotonation of the silanol groups thereby enhancing linear polycondensation. Additionally, the β-diketone complexing agent retards gelation thereby promoting stability of the coating compositions and enhancing shelf-life prior to coating The type of the metal in the complexing agent is not particularly limited. Metals having great constants of complex formation with β-diketone ligands are preferably used.

Examples of such metal complexing agents include metal chelate compounds of β-diketones such as tris(acetylacetonato)aluminum(III), tris(ethyl acetylacetato)aluminum(III), tris(diethylmalonato)aluminum(III), bis(acetylacetonato) copper(II), tetrakis(acetylacetonato)zirconium(IV), tris (acetylacetonato)chromium(III), tris(acetylacetonato)cobalt(III) and titanium(IV) oxoacetylacetonate [$(CH_3COCHCOCH_3)_2TiO$]; and metal chelate compounds of β-diketones with rare earth metals. Preferably the β-diketone complexing is selected from aluminum β-diketone complexing agent, more preferably aluminum acetylacetonates.

The β-diketone complexing agents may be used alone or in combinations of any two or more thereof. The amount of complexing agent added is preferably 0 to 10 weight percent, more preferably 0.1 to 10 weight percent, preferably between about 0.1 and 5 weight percent, based on total added solids of the coating composition.

The coating compositions do not require organic solvents, but may contain water-soluble or water-miscible organic solvents. The total VOC content of the composition should be less than about 20 wt %, preferably less than about 15 wt %, and more preferably less than about 10 wt % of the total weight of the formulation. Preferably the water-soluble or -water miscible organic solvent is a low molecular weight alcohol, preferably having a carbon atom content of less than about 6, including butanol, isopropanol, ethanol and/or methanol and mixtures of these with each other or with VOC-exempt water soluble or water miscible organic solvents. The use of small amounts of such solvents, which are incorporated in amounts so as to conform to existing United States EPA regulations (see, e.g., EPA 40 C.F.R. 51.100(s) and continuing), aids in reducing the surface tension of the coating formulations and improving the ability of these formulations to wet out and spread over hydrophobic surfaces. In addition, alcohol solvents in particular may confer additional storage stability by participating in equilibrium condensation reactions with the alkoxysilanes and/or the silane coupling agents.

The article of the disclosure is a substrate bearing a continuous coating comprising a crosslinked silica nanoparticle-containing alkoxysilane oligomer/silane coupling agent composite. The particles preferably have an average primary particle size of 40 nanometers or less. The term "primary particle size" refers to the average size of unagglomerated single particles of silica. The average particle size may be determined using transmission electron microscopy. As used herein, the term "continuous" refers to covering the surface of the substrate with virtually no discontinuities or gaps in the areas where the coating composition is applied. The term "network" refers to the three-dimensional crosslinked structure comprising the alkoxysilane oligomer crosslinked both within itself, with the silane coupling agents and to the nanoparticle surfaces In some embodiments, articles of the invention comprise a substrate which may be of virtually any construction, transparent to opaque, polymeric, glass, ceramic, or metal, having a flat, curved, or complex shape and having formed thereon a continuous network of a crosslinked silica-nanoparticle-containing composite.

When the coating is applied to transparent substrates to achieve increased light transmissivity, the coated article preferably exhibits a total average increase in transmissivity of normal incident light of at least two percent and up to as much as ten percent or more, depending on the substrate coated, over a range of wavelengths extending at least between 400 to 700 nm. An increase in transmissivity may also be seen at wavelengths into the ultraviolet and/or infrared portion of the spectrum. Preferred coating compositions applied to at least one side of a light transmissive substrate increase the percent transmission of the substrate by at least 5 percent, and preferably by 10 percent, when measured at 550 nm. The polymeric substrates may comprise polymeric sheet, film, or molded material. In some embodiments, where increased transmissivity is desired, the substrate is transparent, meaning that it transmits an average of at least 85% of incident light in the visible spectrum (about 400-700 nm wavelength). Transparent substrates may be colored or colorless.

In other embodiments, where increased hydrophilicity is desired, the substrate may be initially hydrophobic. The compositions may be applied to a wide variety of substrates by a variety of coating methods. The coating compositions of the present invention provide hydrophilicity to a substrate, useful in imparting substantially easier cleaning, reduced tendency to dirt and contaminant deposition, and the properties of water sheeting and self-drying to surfaces without the formation of undesirable water spots observed for hydrophobic substrate surfaces.

Surfaces on which drops of water or aqueous solutions exhibit a water contact angle of less than 50° are referred to as "hydrophilic" using the test method described herein. Hydrophobic substrates have a water contact angle of 50° or greater. Coatings described herein may increase the hydrophilicity of a substrate at least 10 degrees, preferably at least 20 degrees. It is desirable that coated substrates, which initially may be hydrophobic, exhibit after treatment with the coating compositions have water contact angles less than about 50°, preferably less than about 40°, and more preferably less than about 30° even after several weeks to several months outside environmental exposure.

Suitable substrates include, for example, glass (e.g., windows and optical elements such as, for example, lenses and mirrors), ceramic (e.g., ceramic tile), cement, stone, painted or clearcoated surfaces (e.g., automobile body panels, boat surfaces), plastic protective films which are backed with attached to surfaces using pressure-sensitive adhesives, metal (e.g., architectural columns), paper (e.g., adhesive release liners), cardboard (e.g., food containers), thermosets, thermoplastics (e.g., polycarbonate, acrylics, polyolefins, polyurethanes, polyesters, polyamides, polyimides, phenolic resins, cellulose diacetate, cellulose triacetate, polystyrene, and styrene-acrylonitrile copolymers), and combinations thereof.

Typically the substrate is in the form of a film, sheet, panel or pane of material and may be a part of an article such as ophthalmic lenses, architectural glazings, decorative glass frames, motor vehicle windows and windshields, and protective eye wear, such as surgical masks and face shields. The coatings may, optionally if desired, cover only a portion of the article, e.g., only the section immediately adjacent to the eyes in a face shield may be coated. The substrate may be flat, curved or shaped. The article to be coated may be produced by blowing, casting, extrusion, or injection molding.

The coating composition of the invention is particularly useful in the coating of automotive panels having painted or clearcoated surfaces, examples of which include: polyacrylic-polyol-polyisocyanate compositions (e.g., as described in U.S. Pat. No. 5,286,782 (Lamb, et al.); hydroxyl functional acrylic-polyol-polyisocyanate compositions (e.g., as described in U.S. Pat. No. 5,354,797 (Anderson, et al.); polyisocyanate-carbonate-melamine compositions (e.g., as described in U.S. Pat. No. 6,544,593 (Nagata et al.); high solids polysiloxane compositions (e.g., as described in U.S. Pat. No. 6,428,898 (Barsotti et al.)). Examples of clearcoats include CERAMICLEAR™ from PPG Industries, Pittsburgh, Pa. and RK8014™, a urethane acrylate clearcoat available from DuPont.

In addition, other substrates may include but are not limited to polyester (e.g., polyethylene terephthalate, polybutyleneterephthalate), polycarbonate, allyldiglycolcarbonate, polyacrylates, such as polymethylmethacrylate, polystyrene, polysulfone, polyethersulfone, homo-epoxy polymers, epoxy addition polymers with polydiamines, polydithiols, polyethylene copolymers, fluorinated surfaces, cellulose esters such as acetate and butyrate, glass, ceramic, organic and inorganic composite surfaces and the like, including blends and laminates thereof.

The substrate may be opaque, translucent or transparent. It has been found that the composition provides hydrophilic, easily cleanable surfaces to substrates such as flexible films used in graphics and signage. Flexible films may be made from polyesters such as PET or polyolefins such as PP (polypropylene), PE (polyethylene) and PVC (polyvinyl chloride) are particularly preferred.

The substrate can be formed into a film using conventional filmmaking techniques such as extrusion of the substrate resin into a film and optional uniaxial or biaxial orientation of the extruded film. The substrate used in such graphics and signage applications can be treated to improve adhesion between the substrate and the coating composition, using, e.g., chemical treatment, corona treatment such as air or nitrogen corona, plasma, flame, or actinic radiation. If desired, an optional tie layer can also be applied between the substrate and the coating composition to increase the interlayer adhesion. The other side of the substrate may also be treated using the above-described treatments to improve adhesion between the substrate and an adhesive. The substrate may be provided with graphics, such as words or symbols as known in the art. Alternatively, both surfaces of a planar substrate may be coated.

In some embodiments the coating composition provides improved cleanability, a reduced tendency to accumulate dirt and other contaminants. In some embodiments the coating composition further provides a tough, abrasion resistant layer that protects the substrate from damage from causes such as scratches, abrasion and solvents. By "cleanable" it is meant that the coating composition, when dried and cured, provides a coating which is easier to clean by contacting with flowing water or a water spray to readily displace overlying contamination, thereby removing a substantial portion of the contamination from the coating. The water sheeting effect allows road spray, snow, slush and dirt in rainwater to substantially run off the substrate surface, which significantly reduces the amount of contaminants that are deposited after the water dries.

To permit easy coating, the surface tension of the coating composition may be decreased by addition of lower molecular weight alcohols, especially $C_1$ to $C_8$ alcohols. However, in some instances, in order to improve the coating hydrophilicity for desired properties and to ensure uniform coating of the article from an aqueous or hydroalcoholic solution, it may be beneficial to add a wetting agent, which is typically a surfactant. Use of wetting agents generally is not desirable, because such agents are thought to reduce adhesion of the coatings to the substrate, thereby reducing durability, and in addition to cause streaks and haze in the dried coatings.

The term "surfactant" as used herein describes molecules comprising hydrophilic (polar) and hydrophobic (non-polar) segments on the same molecule which are capable of reducing the surface tension of the coating solution. Useful surfactants may include those disclosed in U.S. Pat. No. 6,040,053 (Scholz et al.), incorporated herein by reference.

For typical concentrations of silica nanoparticles (e.g., about 0.2 to 15 percent by weight relative to the total coating composition) most surfactants comprise less than about 0.1 percent by weight of the coating composition, preferably between about 0.003 and 0.05 percent by weight, in order to preserve the anti-reflective properties of the coating. It should be noted that with some surfactants a spotty coating is attained at concentrations in excess of what is needed to achieve the desired properties. In particular, it has been observed that surfactants may reduce the durability of the resultant coatings. Preferably, the coating composition contains no surfactants or wetting agents.

Anionic surfactants in the coating composition are preferred when added to improve the uniformity of the resulting coatings. Useful anionic surfactants include, but are not limited to, those with molecular structures comprising (1) at least one hydrophobic moiety, such as from about $C_6$- to about $C_{20}$-alkyl, alkylaryl, and/or alkenyl groups, (2) at least one anionic group, such as sulfate, sulfonate, phosphate, polyoxyethylene sulfate, polyoxyethylene sulfonate, polyoxyethylene phosphate, and the like, and/or (3) the salts of such anionic groups, wherein said salts include alkali metal salts, ammonium salts, tertiary amino salts, and the like. Representative commercial examples of useful anionic surfactants include sodium lauryl sulfate, available under the trade name TEXAPON L-100 from Henkel Inc., Wilmington, Del., or under the trade name POLYSTEP B-3 from Stepan Chemical Co, Northfield, Ill.; sodium lauryl ether sulfate, available under the trade name POLYSTEP B-12 from Stepan Chemical Co., Northfield, Ill.; ammonium lauryl sulfate, available under the trade name STANDAPOL A from Henkel Inc., Wilmington, Del.; and sodium dodecyl benzene sulfonate, available under the trade name SIPONATE DS-10 from Rhone-Poulenc, Inc., Cranberry, N.J.

Where the coating composition does not include a surfactants or when improved coating uniformity is desirable, it may be beneficial to add another wetting agent, including those that do not impart durable anti-fog properties, in order to ensure uniform coating of the article from an aqueous or hydroalcoholic solution. Examples of useful wetting agents include polyethoxylated alkyl alcohols (e.g. Brij™ 30, and Brij™ 35, commercially available from Croda International, Edison, N.J., and Tergitol™ TMN-6 Specialty Surfactant, commercially available from Dow Chemical and Plastics Co., polyethoxylated alkylphenols (e.g., Triton™ X-100 from Union Carbide Chemical and Plastics Co., Iconol™ NP-70 from BASF Corp.) and polyethylene glycol/polypropylene glycol block copolymer (commercially available as Tetronic™ 1502 Block Copolymer Surfactant, Tetronic™ 908 Block Copolymer Surfactant and Pluronic™ F38 Block Copolymer Surfactant, all from BASF Corp.) Of course, any added wetting agent must be included at a level which will not destroy the anti-reflective properties or increase haze or dimish the visual appearance of the coating. Generally the wetting agent is used in amounts of less than about 0.1 percent by weight of the coating composition, preferably between about 0.003 and 0.05 percent by weight of the coating composition depending on the amount of silica nanoparticles.

The compositions are preferably coated on the article using conventional coating techniques, such as brush, bar, roll, wiping, curtain, rotogravure, spray, or dip coating techniques. For ease and simplicity, a preferred method is to wipe the coating formulation on using a suitable woven or nonwoven cloth or sponge. Such application materials may be hydrophilic or hydrophobic in nature in order to control the amount of composition that is deposited and to thereby control final coat thickness. Another method to control final thickness and resultant appearance is to apply the coating using any suitable method and, after allowing a portion of the solvent to evaporate, to rinse off excess coating liquid with a stream of water.

Surprisingly, a thin layer of active material may be so deposited on the substrate surface while essentially preventing iridescence or roughness.

The coatings of the present invention are preferably applied in uniform average thicknesses varying from 20 to 1000 Å, and more preferably by less than 100 Å, in order to avoid visible interference color variations in the coating. Preferably a coating of the present invention is at least about 20 Angstroms thick, and more preferably, at least about 30 Angstroms thick. The optimal average dry coating thickness is dependent upon the particular coating composition, but in general the average thickness of the coating is between 50 and 1000 Å, preferably 50 to 500 Å, and more preferably less than about 250 Å, as estimated from atomic force microscopy and/or surface profilometry. Above this range coating thickness variations cause optical interference effects, leading to visible iridescence (rainbow effect) of the dried coating which is particularly apparent on darker substrates. Below this range the coating thickness may be inadequate to confer sufficient durability for most coatings exposed to environmental wear.

After coating the article is typically dried at ambient temperatures without the need for heat, radiation or other curing method. Although higher temperature may increase the speed of the drying process, such temperatures are usually not practical or convenient and care must be exercised to avoid damage to the substrate. After the coating composition is applied to the substrate and dried, the coating comprises preferably from about 30 to 95 percent by weight (more preferably from about 50 to 75 percent by weight) of silica nanoparticles, from about 1 to 55 percent by weight percent by weight (more preferably from about 25 to 50 percent by weight) alkoxysilane oligomers and 0.25 to 35 wt. % of said silane coupling agent; and 0 to 10 wt. %, preferably 1-5 wt. % of said metal β-diketone complexing agent, and optionally about 0 to 5 percent by weight (more preferably from 0 to about 2 percent by weight) surfactant, and up to about 5 percent by weight (preferably 0 to 2 percent by weight) wetting agent.

In many embodiments, the coating compositions of the present invention are stable when stored in the liquid form, e.g., they do not gel, opacify, form precipitated or agglomerated particulates or otherwise deteriorate significantly. Further, in many embodiments, the coatings applied to articles are found to be durable and abrasion resistant using the test methods described herein and do not exhibit significant iridescence, if any.

EXAMPLES

Materials

MKC MS51™—a partial condensate of tetramethylorthosilicate, approx. MW 600, available from Mitsubishi Chemical or Fuso Chem. Co., Osaka, JP.

VTMOS—vinyltrimethoxysilane, available from Huls America, Bristol Pa.

Silica nanoparticle dispersions are available from the Nalco Chemical Company, Naperville, Ill. as Nalco 1115™ (4 nm), 2326™ (5 nm), 1030™ (13 nm), and 1050™.

Test Soil—3M Standard Carpet Dry Soil SPS-2001™, available from the 3M Company, St. Paul, Minn.

Aluminum acetylacetonate, available from Aldrich Chem. Co., Milwaukee, Wis.

Emcol 4500™—sodium dioctyl sulfosuccinate, available from Witco Chemical Co., NY.

0.1 N HCl, available from Aldrich Chemical Co., Milwaukee, Wis.

Test Panels—aluminum test panels coated with DuPont Cormax™ 6EP e-coat, DuPont 708DM730 primer, DuPont 648DN027 black base coat, and DuPont RK8014™ clearcoat prepared and supplied by ACT Test Panels Inc., Hillsdale, Mich.

Preparation and Testing

Panel Coating Methods

Test panels were coated by one of two methods. The first method is to apply several drops of the coating composition to the painted surface of a test panel laid flat, and using a plastic pipette to spread the coating across the panel surface. Following this coating step, the panels are held at a 30° angle to the vertical to allow excess coating solution to drain. In the second method, the coating solution is wiped onto the painted surface of the test panel using the desired woven or nonwoven cloth using overlapping circular strokes to achieve a uniform coated appearance. In both methods the panels are subsequently stored in ambient conditions for 24 hours to allow the formulations to cure.

Coating Characterization Methods

Coating thickness and quality was evaluated using atomic force microscopy (AFM) and surface profilometry. Coated samples for analysis were prepared by coating onto cleaned 5 mil thick polyester film. All samples were dried and cured prior to measurements. The AFM measurements were obtained using a Digital Instruments Dimension 3100 SPM System equipped with a Nanoscope V controller. The probes used were Olympus OTESPA single crystal silicon probes. These probes have a force constant of ~40N/M. Data analysis was carried out using Nanoscope 5.12 software. The images were planefitted in xy using $1^{st}$ order planefitting algorithms of Nanoscope 5.12.

Surface profilometry measurements were obtained using a Wyko NT3300 optical profilometer available from Veeco Instruments Inc., Plainview, N.J. The settings used were a 1× speed VSI, full resolution, 1% modulation threshold, back scan of 10, scan length of 10, using a 50× objective with 1.0 FOV.

Abrasion Testing

The abrasion testing is described in ASTM D 2486-00, "Scrub Resistance of Wall Paints" using a BYK Gardener Abrasion Tester operating at 37 cycles/min. and equipped with a weighted sponge assembly of 450 gm weight, with an O-Cell-O™ sponge (available from the 3M Company) and an abrasion surface area of 4"×3". Sample panels are fixed, coated side up, in an aluminum test bed. The sponge is saturated with deionized water, and cyclically scrubs the coated panel surface to the desired cycle end point. The test is run at 5, 10 or 20 cycles.

Surface abrasion/wear is evaluated by visual inspection of the water sheeting behavior of the coating after abrasion; the percent surface area which wets out water is estimated after abrasion and reported in the Tables as "percent intact".

Soil Pick-Up Test

Coated samples were subjected to soiling by exposing them to a 2 weight percent mixture of 3M Standard Carpet Test soil in water. In order to emulate conditions of road splash or spray, the panels were exposed to two second duration of a 20 psig pressurized spray of the soiling mixture using a 3M Body Schutz™ Applicator Gun (available from the 3M Company, Part No. 08997). The water/soil mixture was kept agitated in a tank measuring 32"×15"×10.5", with the nozzle tip being 29" from the panel. The panel was removed and dried 5 min at 50° C., then returned to the soiling chamber. The cycle was repeated a total of 2 times. After the drying step, the panel was loaded into a separate clean water tank measuring 33"×16"×14 and sprayed using 60 psig water pressure and tap water for 5 seconds with the nozzle tip being 32" from the panel. The sample was subjected to a final drying step, and then evaluated visually. In addition, the weight change of the panel before and after the soiling cycle is measured. The results are given in Table 8.

Contact Angle Measurement

Water contact angle measurements were made using OmniSolv™ purified and filtered water (EM Science, Gibbstown, N.J., USA). The contact angle analyzer used is a custom-built manual instrument equipped with a BYK-Gardner Scientific Corporation (Olumbia, Md., USA) goniometer-microscope mounted on a horizontal positioning device (UniSlide® Series A2500) made by Velmex, Inc. (Holcomb, N.Y., USA). Water droplets approximately 0.5 µl in volume are dispensed by the turning of a micrometer thimble, barrel, and spindle (No. 263, L. S. Starrett, Athol, Mass., USA) to depress the plunger of a 1 cc syringe (Henke Sass Wolf GmbH, Tuttlinger, Germany) fitted with a flat-tipped needle shaped using 3M 414N TR1-M-ITE sandpaper grade 220. The drop is backlit through a translucent paper screen with a small lamp. The syringe is mounted on a double-armed holder which is lowered through a screw crank to deposit the water drop on the test specimen as it rests on an adjustable platform. The leveling of the contact angle instrument is monitored with a circular bull's-eye level and can be adjusted through four leveling screws. Contact angle is measured on sessile water drops approximately 30 seconds after deposition, and the value reported is the average of at least three separate measurements.

Separately, hydrophilicity may be qualitatively assessed by observation of the coated surface after dipping in water; a hydrophilic coating becomes completely wet-out by a continuous sheet of water after dipping, and remains wet for at least 5 seconds.

Preparation of Coating Composition

Formulations of the reactive silane component (which includes the alkoxysilane oligomer, coupling agent and complexing agent, if any), and nanoparticle component, each component formulation at 5 weight percent in solvent or water, were separately prepared.

The reactive silane component was prepared by adding appropriate amounts of MKC MS51 alkoxysilane oligomer at 10 wt % in isopropanol to a mixture of water and isopropanol with stirring. The silane coupling agent, at 10 wt % in isopropanol, was next added to the alkoxysilane oligomer mixture with stirring. Finally, the aluminum acetylacetonate at 3 wt % in methanol was added to the mixture with continued stirring. The nanoparticle component was separately prepared by dilution in deionized water of the concentrated sol commercially obtained. In the examples using surface modified nanoparticles, such particles were also added from diluted dispersions in deionized water.

Preparation of Surface Modified Silica Nanoparticles

Sulfonate surface modified silica nanoparticles were prepared by adding to a stirred dispersion of 5 nm silica nanoparticles (Nalco 2326, 50.02 g, 16.0% solids), 3-(tris hydroxysilyl)-1-propanesulfonic acid (6.15 g, 32.5% in water) and isopropanol (56 g) The reaction was heated to 50° C. for 5 hrs to produce a dispersion of surface modified particles at 8.5% solids.

Preparation of Coating Composition

The coating composition was prepared by direct addition of the appropriate amount of nanoparticle masterbatch dispersion to the alkoxysilane/coupling agent/aluminum acetylacetonate mixture with stirring. To this mixture 0.1 normal HCl was rapidly added with stirring to the mixture. In some examples, surfactant or wetting agents were added to this mixture using 1 wt % solution or dispersion, in deionized water. In the examples below, Emcol™ 4500 anionic surfactant was used. All final mixtures were stored in plastic bottles fitted with screw top caps.

Solutions were prepared to evaluate a range of pH values from approx. 2 to approx. 10.5. Unless otherwise noted, all solutions had a ratio of nanoparticles to reactive silicate of 2:1 (w/w). The coating compositions are shown in Table 1, giving the theoretical dry amounts of alkoxy silane and nanoparticle added.

TABLE 1

| Preparation Number | Nanoparticle size (nm) | Surface Functionality | Nanoparticle (grams) | HCl (grams) | H₂O (grams) | IPA (grams) | Reactive silanes (grams)* | Emcol 4500 (grams) | pH |
|---|---|---|---|---|---|---|---|---|---|
| 1 | 5 | —SO₃H | 0.05 | 1.14 | 4.783 | 1.5 | 0.025 | 0.002 | 2.2 |
| 2 | 5 | —SO₃H | 0.05 | 0 | 5.923 | 1.5 | 0.025 | 0.002 | 7.3 |
| 3 | 5 | —SO₃H | 0.05 | 1.14 | 4.785 | 1.5 | 0.025 | 0 | 2.1 |
| 4 | 5 | —SO₃H | 0.05 | 0 | 5.455 | 1.5 | 0.025 | 0 | 7.2 |
| 5 | 5 | none | 0.05 | 1.14 | 4.783 | 1.5 | 0.025 | 0.002 | 2.2 |
| 6 | 5 | none | 0.05 | 0 | 5.923 | 1.5 | 0.025 | 0.002 | 7.3 |
| 7 | 5 | none | 0.05 | 1.14 | 4.785 | 1.5 | 0.025 | 0 | 2.2 |
| 8 | 5 | none | 0.05 | 0 | 5.455 | 1.5 | 0.025 | 0 | 7.2 |
| 9 | 4 | none | .025 | 1.14 | 5.26 | 1.025 | .050 | 0 | 2.3 |
| 10 | 4 | none | .0375 | 1.14 | 5.26 | 1.025 | .0375 | 0 | 2.4 |
| 11 | 4 | none | .050 | 1.14 | 5.26 | 1.025 | .025 | 0 | 2.7 |
| 12 | 5 | none | .025 | 1.14 | 5.26 | 1.025 | .050 | 0 | 2.3 |
| 13 | 5 | none | .0375 | 1.14 | 5.26 | 1.025 | .0375 | 0 | 2.2 |
| 14 | 5 | none | .050 | 1.14 | 5.26 | 1.025 | .025 | 0 | 2.4 |
| 15 | 8 | none | .025 | 1.14 | 5.26 | 1.025 | .050 | 0 | 2.3 |
| 16 | 8 | none | .0375 | 1.14 | 5.26 | 1.025 | .0375 | 0 | 2.3 |
| 17 | 8 | none | .050 | 1.14 | 5.26 | 1.025 | .025 | 0 | 2.3 |
| 18 | 20 | none | .025 | 1.14 | 5.26 | 1.025 | .050 | 0 | 2.2 |
| 19 | 20 | none | .0375 | 1.14 | 5.26 | 1.025 | .0375 | 0 | 2.2 |
| 20 | 20 | none | .050 | 1.14 | 5.26 | 1.025 | .025 | 0 | 2.2 |
| 21 | 4 | none | .050 | 1.125 | 5.175 | 1.125 | .025 | 0 | 2.3 |
| 22 | 4 | none | .050 | 0.750 | 5.550 | 1.125 | .025 | 0 | 3.1 |
| 23 | 4 | none | .050 | 0.375 | 5.925 | 1.125 | .025 | 0 | 9.9 |
| 24 | 4 | none | .050 | 0 | 6.300 | 1.125 | .025 | 0 | 10.7 |

*The "reactive silanes" in Table 1 includes the an alkoxysilane oligomer; silane coupling agent, and metal β-diketone complexing agent in a 3:1:0.2 weight ratio

Examples 1-8

In the following Examples, test panels were coated with the indicated compositions from Table 1. After coating and curing, test panels were subjected to 20 cycles of abrasion as described in the test methods and evaluated for retained hydrophilicity. Table 2 gives the results for the coatings and the effect of pH and surfactant on durability of the hydrophilic coating behavior.

TABLE 2

| Example No. | Prep # | % Intact (20 cycles) |
|---|---|---|
| 1 | 1 | 25 |
| 2 | 2 | 10 |
| 3 | 3 | 90 |
| 4 | 4 | 40 |
| 5 | 5 | 30 |
| 6 | 6 | 20 |
| 7 | 7 | 90 |
| 8 | 8 | 75 |

From Table 2, low pH formulations tend to exhibit better durability, with or without added surfactant. The surfactant tends to cause moderate to significantly reduced durability. It is noted that the nonfunctionalized nanoparticle composites exhibit greater durability than those made with sulfonate modified nanoparticles.

Examples 9-16 and C-1

The solutions were allowed to age for 30 and 60 days in ambient conditions. Because of the initial poor performance of surfactant modified formulations, only the non-surfactant containing formulations were recoated and subjected to abrasion cycles and water contact angle measurement. For further comparative purposes, an uncoated test panel was also tested (C-1). The results are shown in Table 3 along with a visual ranking of coating iridescence; "+" indicates the coating is clear, without color or 'rainbow' appearance; "o" indicates a clear coating with some iridescence, while "−" indicates a coating having visible particulates and significant color/iridescence.

TABLE 3

| Example | Preparation Number | Solution Age | Initial Contact Angle (°) | 5 cycles Contact Angle (°) | 10 cycles Contact Angle (°) | 20 cycles Contact Angle (°) | Iridescence (+, o, −) |
|---|---|---|---|---|---|---|---|
| 9 | 3 | 30 days | 15.0 | 20.2 | 23.6 | 26.8 | + |
| 10 | 3 | 60 days | 8.1 | 16.5 | 18.9 | | + |
| 11 | 4 | 30 days | 9.1 | 18.4 | 22.2 | 25.6 | o |
| 12 | 4 | 60 days | 7.2 | 17.9 | 22.7 | | o |
| 13 | 7 | 30 days | 19.3 | 22.2 | 28.5 | 33.4 | + |
| 14 | 7 | 60 days | 7.6 | 23.4 | 22.7 | | + |
| 15 | 8 | 30 days | 3.9 | 12.5 | 15.8 | 19.1 | − |
| 16 | 8 | 60 days | 8.0 | 14.3 | 19.5 | | − |
| C-1 | Blank | | 83.8 | 81.9 | 82.4 | 75.4 | NA |

Table 3 indicates that these nanoparticle/silicate coatings retain good hydrophilicity even after 20 abrasion cycles, as indicated by water contact angles below about 30°. The difference between the coatings is in the visual appearance; increased aging tends to produce coatings with increased particulate defects and iridescence, which are undesirable. he inventive examples 9-10 and 13-14 however exhibit no particulates, low water contact angle and no iridescence upon coating the aged formulations.

Examples 17-18

In the following Examples 17 and 18 a comparison is made between low and neutral pH coatings based on unmodified nanoparticle containing composites. In this case, the liquid coating formulations were subjected to accelerated heat aging at 120° F. (50° C.) for a period of up to 6 weeks. Following aging, coatings were applied to glass microscope slides and to painted test panels and visually evaluated for particles and iridescence. Additionally, the coated test panels were then subjected to 5 cycles of abrasion and evaluated for presence of the coating (% intact). In Table 4, the presence of particles is ranked as follows: a "+" indicates no visible particles; an "o" indicates few particles; and a "−" indicates many particles.

TABLE 4

| Example | Coating composition | % Intact | 2 wks 120° F. Particles | Iridescence | 6 wks 120° F. Particles | Iridescence |
|---------|---------------------|----------|-------------------------|-------------|-------------------------|-------------|
| 17 | 7 | 90% | + | + | + | ○ |
| 18 | 8 | 75% | ○ | − | ○ | − |

The results of Table 4 indicate that lower pH compositions exhibit improved durability as measured by % intact after abrasion, and better visual appearance without particulates or significant iridescence. These data indicate that lower pH formulations have greater stability in terms of storage and aging than higher pH formulations.

Examples 19-30

In the following Examples 19-30, coating compositions were prepared which varied in the size of the silica nanoparticles and the amount of nanoparticles in the composition. The coating composition were acidified to low (e.g., 2-3) pH, and then coated. After ambient curing for 24 hours, the coated test panels were subjected to 5 and 10 cycles of the abrasion test, followed by contact angle measurements, evaluation of % intact coating and iridescence. The results are shown in Table 5.

TABLE 5

| Example | Nanoparticle/ alkoxy silane ratio | Prep number | Initial Contact angle ° | Contact angle ° (5/10 cycles) | % Intact (10 cycles) | Iridescence |
|---------|-----------------------------------|-------------|-------------------------|-------------------------------|----------------------|-------------|
| 19 | 1:2 | 9 | 26.5 | 39.6/46.6 | 100 | + |
| 20 | 1:1 | 10 | 27.0 | 60.1/69.4 | 100 | + |
| 21 | 2:1 | 11 | 10.8 | 18.2/24.7 | 100 | ○ |
| 22 | 1:2 | 12 | 36.4 | 51.0/63.9 | 100 | ○ |
| 23 | 1:1 | 13 | 16.2 | 24.1/31.5 | 100 | ○ |
| 24 | 2:1 | 14 | 10.7 | 23.9/29.8 | 100 | − |
| 25 | 1:2 | 15 | 29.6 | 38.1/43 | 100 | + |
| 26 | 1:1 | 16 | 15.8 | 35.1/45.2 | 100 | ○ |
| 27 | 2:1 | 17 | 11.6 | 15.7/21.5 | 75 | − |
| 28 | 1:2 | 18 | 39.7 | 50.7/56.7 | 100 | ○ |
| 29 | 1:1 | 19 | 29.4 | 24.3/35.9 | 75 | − |
| 30 | 2:1 | 20 | 20.4 | 23.5/35.2 | 50 | − |

The results of Table 5 indicate that increasing nanoparticle content of the composites leads to improved hydrophilicity of the coatings, that is, lower water contact angles. However, coating durability and appearance (iridescence) declines with increasing amounts of nanoparticles, particularly with larger nanoparticles. Increasing the ratio of nanoparticles to alkoxysilane oligomer results in less binder available to provide a durable coating, while higher ratios can lead to local thickness variations, perhaps locally agglomerated particles, and iridescence. Smaller average diameter nanoparticles appear to perform better with respect to all measurements than larger particles.

Examples 31-32 and C2-C3

In Examples 31-32 and C2-C3, series of compositions identical to Example 1 were prepared in which the acid content was adjusted in order to produce different final pH formulations. The effect of pH on the ability of formulations to wet-out and spread across a hydrophobic test panel surface was visually observed as follows. A drop of the example formulation was placed onto a panel with an initial observation of contact angle, that is, if the drop spontaneously spreads or remains beaded up. Next, the drop was drawn across the substrate surface using a plastic pipette to determine if the formulation remained spread evenly across the surface or retracted to form non-wet-out droplets. A formulation passing both tests was designated as positive for wet-out. The results are shown in Table 6.

TABLE 6

| Example | Preparation Number | pH | Wet-out on Panel |
|---------|---------------------|-----|------------------|
| 31 | 21 | 2.3 | Yes |
| 32 | 22 | 3.1 | Yes |
| C-2 | 23 | 9.9 | No |
| C-3 | 24 | 10.7 | No |

The results of Table 6 indicates that unmodified nanoparticle coating compositions with low pH formulations can readily be wet-out onto substrate surfaces.

Examples 33-34 and C-4

The coating compositions of preparations 3 and 7 were coated onto one-half of the front hood and roof surfaces of a 1997 Honda Accord. The other half of each surface was coated with a commercially available car wax (3M Performance Finish, Part Number 38112, 3M Company, St. Paul, Minn.). All materials were applied by wiping on with a microfiber detailing cloth (3M Detailing Cloth, Part Number 06017, 3M Company, St. Paul, Minn.). The samples were allowed to dry at room temperature, then the vehicle exposed to normal driving conditions for a period of two weeks. The specular gloss at a 20° angle was evaluated on the treated and wax-coated surfaces before and after exposure using a hand held BYK Gardner Microgloss meter according to ASTM D2457-08. In addition, water contact angles were measured after the environmental exposure. The data are shown in Table 7.

TABLE 7

| Preparation Number | Surface | 20° Gloss Initial | 20° Gloss Final (14 days) | Contact Angle Final (°) |
|---------------------|---------|-------------------|---------------------------|-------------------------|
| 33 | 3 | Hood | 73.0 | 67.6 | 24.9 |
| C-4 | Wax | Hood | 73.5 | 73.9 | 87.5 |
| 34 | 7 | Roof | 75.2 | 76.1 | 23.2 |
| C-4 | Wax | Roof | 75.7 | 75.6 | 88.3 |

As is shown in Table 7, the glossy appearance of the paint finish is retained with either Example coating, and compares favorably to the traditional "deep gloss" finish for the commercial wax coating. The surfaces treated with the experimental materials exhibited good hydrophilicity as demonstrated by water contact angles less than about 30°. By comparison, the wax coated surfaces exhibited nearly a 90° contact angle, and were observed to completely bead water. Further observations indicate the hydrophilic effect is maintained for a period of at least 3 months.

Example 35 and C5-C6

Preparation 7 at 0.5% solids was coated on a test panel using the wipe-on technique with a microfiber detailing cloth (3M Detailing Cloth, Part Number 06017, 3M Company, St. Paul, Minn.). Another panel was coated with a commercially available car wax (3M Performance Finish, Part Number 38112, 3M Company, St. Paul, Minn.). Another panel was left uncoated.

After subjecting the panels to soil pickup and rinse cycles as described earlier, the panels were dried and reweighed to evaluate soil pickup. The panels were then wiped using a tissue, and the amount of soil transferred to the tissue was evaluated visually. The panels were next evaluated for presence of visible soil residue. The results are collected in Table 8.

TABLE 8

| Example | Preparation Number | Weight Change (mg) | Dirt on Cloth | Visible Residue |
| --- | --- | --- | --- | --- |
| C-5 | Blank | 7.1 | High | Yes |
| C-6 | Wax | 2.2 | Medium | Yes |
| 35 | 7 | 0.3 | Low | No |

Compared to both control and wax-coated panels, the panel coated with Preparation 7 exhibits much less accumulation of soil, and any deposited soil is much more completely removed by wiping to leave a cleaner surface. This suggests the residual soil, if any, is less tightly bound to the surface for the Example 35 material compared to the uncoated or wax-coated panel, and easier to remove.

Examples 36-37

The surface analysis results from AFM and profilometry are compared below for a panel coated with Preparation 7. Sample panels were prepared by wiping on as before. The coating thickness and uniformity are given in Table 9. The term "Ra" refers to the arithmetic mean of the variance in surface height, or uniformity, while "Rq" refers to the root mean square average of the surface roughness of a coated section of the surface compared to a section of the same surface with the coating removed. Both the AFM and profilometry techniques yield values of coating thickness of about 10-11 nm, with a thickness average deviation (Ra) of about 4 nm. As will be clear to those skilled in the art, application of additional coatings, or application of coatings from higher or lower solution concentrations, will result in thicker or less thick final (dried) coatings.

TABLE 9

| Example | Preparation Number | Technique | $R_a$ (nm) | $R_q$ (nm) |
| --- | --- | --- | --- | --- |
| 36 | 7 | AFM | 3.81 | 10.92 |
| 37 | 7 | Profilometry | 4.32 | 10.18 |

TABLE 10

| Preparation Number | Nanoparticle size (nm) | Surface Functionality | Nanoparticle (grams) | HCl (grams) | H2O (grams) | IPA (grams) | Reactive silanes (grams) * | pH |
| --- | --- | --- | --- | --- | --- | --- | --- | --- |
| 25 | 4 | none | 2.0 | 45 | 196 | 45 | 1 | 2.63 |

Sample panels were coated with Preparation number 25 as follows. A clean, white painted test panel 3"×18" (7.6 cm×30.5 cm) was laid flat on a horizontal surface, with a strip of ⅛" (0.32 cm) tape marking the panel into 6" (15.2 cm) long halves. Preparation 25 was applied using a sponge to cover one half the test panel completely in liquid. The liquid was allowed to remain in contact with the test panel surface for 30 seconds, then the excess coating material was removed using a stream of ordinary tap water. The panel was propped onto one edge to allow drying. This coating method was designated as "1X" to denote one cycle of application and rinsing. The test panel was designated as Example 38.

In the same fashion, an identical test panel (Example 39) was coated with Preparation 25, rinsed, and allowed to dry, and then a second layer of coating was applied with the same method over top of the initial coating. Two cycles of application and rinsing were thus designated as "2X."

For comparison a test panel was treated on one half with wax as for Example C-4 above. This panel was designated as C-7.

Example test panels 38, 39 and C-7 were subjected to 96 days of environmental exposure by placing the test panels at an angle of 60° with full southern exposure in St. Paul, Minn. during the summer season. Following this exposure, the panels were removed and subjected to visual inspection, gloss measurements and static contact angle measurements as described previously.

The results are given in Table 11. In Table 11, the category of visible dirt is an estimate of dirty water spots from rain, condensation, etc. visible on the surface with a score of "−" indicating multiple dirt spots, "0" indicating few dirt spots and "+" indicating no dirt spots. Finally, by way of comparison, data for the untreated halves of each test panel also are included in Table 11.

TABLE 11

| Example | Preparation Number | Visible dirt | Gloss 20° | Gloss 60° | Gloss 85° | Contact Angle (°) |
| --- | --- | --- | --- | --- | --- | --- |
| 38 | 25 1X | + | 85.1 | 88.8 | 85.2 | 41.1 |
|  | Untreated |  | 76.8 | 80.5 | 70.3 | 72.9 |
| 39 | 25 2X | + | 84.6 | 89.8 | 81.3 | 33.4 |
|  | Untreated |  | 76.9 | 78.9 | 73.5 | 66.9 |
| C-7 | Wax | − | 75.3 | 77.8 | 74.5 | 95.4 |
|  | Untreated |  | 79.4 | 81.9 | 75.8 | 76.5 |

There is significantly less visible dirt remaining on the portions of the test panels treated with this invention as compared with either the untreated portions or to the waxed surface. The treated surfaces were able to maintain their hydrophilic character even with 3 months outdoor exposure, showed no signs of yellowing and did not bead environmental water to cause water or dirt spots. Similarly, the portions of the test panels treated with coatings of this invention exhibited significantly higher gloss values than either the untreated or wax comparative surfaces after outdoor exposure for 96 days. This indicates the ability of the inventive coatings to reduce dirt buildup due to deposition of environmental contaminants. Finally, the water contact angles measured for the treated sections of the test panels were significantly lower and in the range of hydrophilic character for the coatings of this invention. Therefore it is clear that the coatings of this invention are durable with respect to outdoor environmental contamination and UV exposure, and when applied with the method of coating and subsequently rinsing the excess liquid coating off, of forming haze and color free coatings of remarkable durability.

Preparation 25 was also used to coat a passenger vehicle, a 2006 Honda Civic in which one half of the car was taped off and coated with a wax as for Examples C-4 and C-7, and the other half subjected to treatment as described above for the test panels. In this test, the entire vehicle half was coated with the inventive coating, including glass, paint and rubber. A simple sponge was employed to spread the liquid coating so as to cover the entirety of the vehicle surface area, and the liquid coating allowed to dwell for about 60 seconds in contact with the surface and the excess rinsed off using a stream of water from an ordinary garden hose. The treated half of the vehicle immediately displays hydrophilic character in the form of instant water sheeting.

This vehicle was driven as normal for a period of 4 months in St. Paul, Minn. from approximately April to approximately July. During this period the vehicle displayed continuous and durable hydrophilic character on the inventive coating treated half, and typical wax water beading on the other half. There was visibly much less dirt pickup on the inventive coating treated half. Surprisingly, the window glass so treated exhibits a much more transparent, clear appearance with no visible evidence of water spots or dirt pickup. As a consequence, the windows were easier to see through.

Finally, a test panel prepared as for Example 38 was prepared and adhered with dual side adhesive tape to the horizontal rear bumper of a vehicle and subjected to four days driving in very dusty desert conditions. It was observed that the panel half treated with the inventive coating exhibited much less dust and dirt pickup, even dry dust and dirt, compared with either an untreated or a wax-treated section. Therefore, it appears that the coatings of the present invention also exhibit utility in reducing dry dust and dirt pickup.

The transmissivity of representative coatings applied to laboratory-grade glass slides was measured using a BPI Dual Computer-Cal II™ UV/Visible Digital Spectrophotometer (manufactured by Brain Power Incorporated, Miami Fla.). First the average transmissivity of each uncoated glass slide was measured over the visible range of 400 to 700 nanometers. Then each slide was coated by one of three methods and the average transmissivity of the coated slide again measured. The coating methods were:

1) a wipe-on method ("Wipe") using a 0.25% solids formulation prepared by diluting a 1% solids formulation with an 85/15 water/isopropanol mixture, 2) a coat & rinse method (C&R) using a 1% solids formulation, allowed to dwell for 30 seconds at ambient temperature and humidity, then rinsed with deionized water; and 3) a slide was coated on both large surfaces by wiping on a 1% solids coating composition ("Wipe 2X"). Methods 1 and 3 involving wiping utilized a 3M microfiber detailing cloth.

The results of the transmissivity are shown in the following Table 12. As can be seen, each of the coated slides exhibited transmissivity of 93% of greater over the visible range. In some instances the coated slide exhibited an improvement in transmissivity over the corresponding uncoated slide. As the transmissivity of the coated glass was comparable to or exceeded that of the uncoated glass, the measured transmissivities of the coatings per se were comparable to or exceeded the transmissivities of the uncoated glass slides. That is, the transmissivity of the coatings was at least 93%.

TABLE 12

| Example Coating | Coating Method | Percent Solids | Transmissivity of untreated glass slide (%) | % Transmissivity of coated glass slide (%) |
|---|---|---|---|---|
| Ex. 11 | Wipe | 0.25 | 92.7 | 93.3 |
|  | C&R | 1.00 | 93.3 | 94.0 |
|  | Wipe 2X | 1.00 | 94.3 | 94.0 |
| Ex. 14 | Wipe | 0.25 | 92.7 | 93.3 |
|  | C&R | 1.00 | 94.3 | 93.0 |
| Ex. 20 | Wipe | 0.25 | 93.3 | 94.0 |
|  | C&R | 1.00 | 94.7 | 94.0 |

What is claimed is:

1. A coating composition having a pH of less than 7.5 comprising:
   a) an aqueous dispersion, of 50 to 74 wt. % of silica nanoparticles having average particle diameters of 40 nanometers or less, based on total solids of the coating composition;
   b) 25 to 49 wt %, based on total solids of the coating composition, of a mixture of linear and branched alkoxysilane oligomers of the formula:

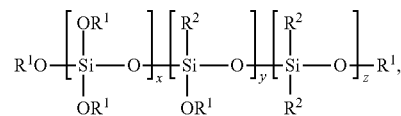

where
   each $R^1$ is individually H, $C_1$ to $C_4$ alkyl, an alkali metal, and earth metal or ammonium;
   each $R^2$ is independently $C_1$ to $C_4$ alkyl,
   x is 2 to 100,
   y and z may be zero,
   x is greater than y+z; and
   x+y+z is 2 to 100;
   c) 0.25 to 24 wt. %, based on total solids of the coating composition, of a silane coupling agent, and
   d) 0 to 10 wt. %, based on total solids of the coating composition, of a metal β-diketone complexing agent;
   when cured, transmits at least 85% of incident light in the range of 400-700 nm.

2. The coating composition of claim 1 wherein said silane coupling agent is of the formula:

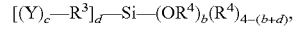

where
   Y is a non-basic group that may bond to, or associate with, the surface of a preselected substrate, R³ is a covalent bond or a di- or trivalent hydrocarbon bridging group, R⁴ is independently an alkyl, aryl, or aralkyl group of 1 to 8 carbon atoms optionally substituted in available positions by oxygen, nitrogen and/or sulfur atoms;

c is 1 or 2, b is 1 to 3 and d is 1 or 2 and (b+d)≤4.

3. The coating composition of claim 2, wherein the Y is an ethylenically unsaturated group Y².

4. The coating composition of claim 1 wherein the silica nanoparticles have average particle diameters of 20 nanometers or less.

5. The coating composition of claim 1 wherein the silica nanoparticles have average particle diameters of 10 nanometers or less.

6. The coating composition of claim 1 wherein the β-diketone complexing agent is used in amounts of 0.1 to 5 wt. %, based on total solids of the coating composition.

7. The coating composition of claim 1 further comprising less than 20 wt. % of a water-soluble or water-miscible organic solvent.

8. The coating composition of claim 1 having a pH value of less than 4.

9. The coating composition of claim 8 wherein the composition is acidified to a pH value of less than 4 with an acid having a pKa of less than 5.

10. The coating composition of claim 9 wherein said acid is selected from oxalic acid, propionic acid, formic acid, citric acid, benzoic acid, acetic acid, benzenesulfonic acid, $H_2SO_3$, $H_3PO_4$, $CF_3CO_2H$, HCl, HBr, HI, $HBrO_3$, $HNO_3$, $HClO_4$, $H_2SO_4$, $CH_3SO_3H$, $CF_3SO_3H$, $CF_3CO_2H$, and $CH_3OSO_2OH$.

11. The coating composition of claim 1, wherein the silica nanoparticles are not surface modified prior to incorporation by surface-modifying agents of the formula A-B, where the A group is capable of attaching to the surface of the nanoparticle and the B group is a compatibilizing group that does not react with other components in the system.

12. The coating composition of claim 1 exhibiting a water contact angle of less than 50° when cured.

13. The reaction product of the coating composition of claim 1 comprising the reaction product of the alkoxysilane oligomer, the silane coupling agent and optionally the metal β-diketone complexing agent.

14. An article having a hydrophilic coating prepared from the coating composition of claim 1.

15. A coated article comprising a substrate having a dried coating of the coating composition of claim 1 thereon.

16. The coated article of claim 15 having a water contact angle of less than 50°.

17. The coated article of claim 15 wherein said coating is less than about 1000 angstroms thick.

18. The coated article of claim 15 wherein said substrate is selected from the group consisting of glass, ceramic, cement, stone, painted or clearcoated surfaces, metal, paper, thermoset polymers and thermoplastic polymers.

19. The coated article of claim 15 wherein the coating transmits at least 85% of incident light in the range of 400-700 nm.

* * * * *